UNITED STATES PATENT OFFICE.

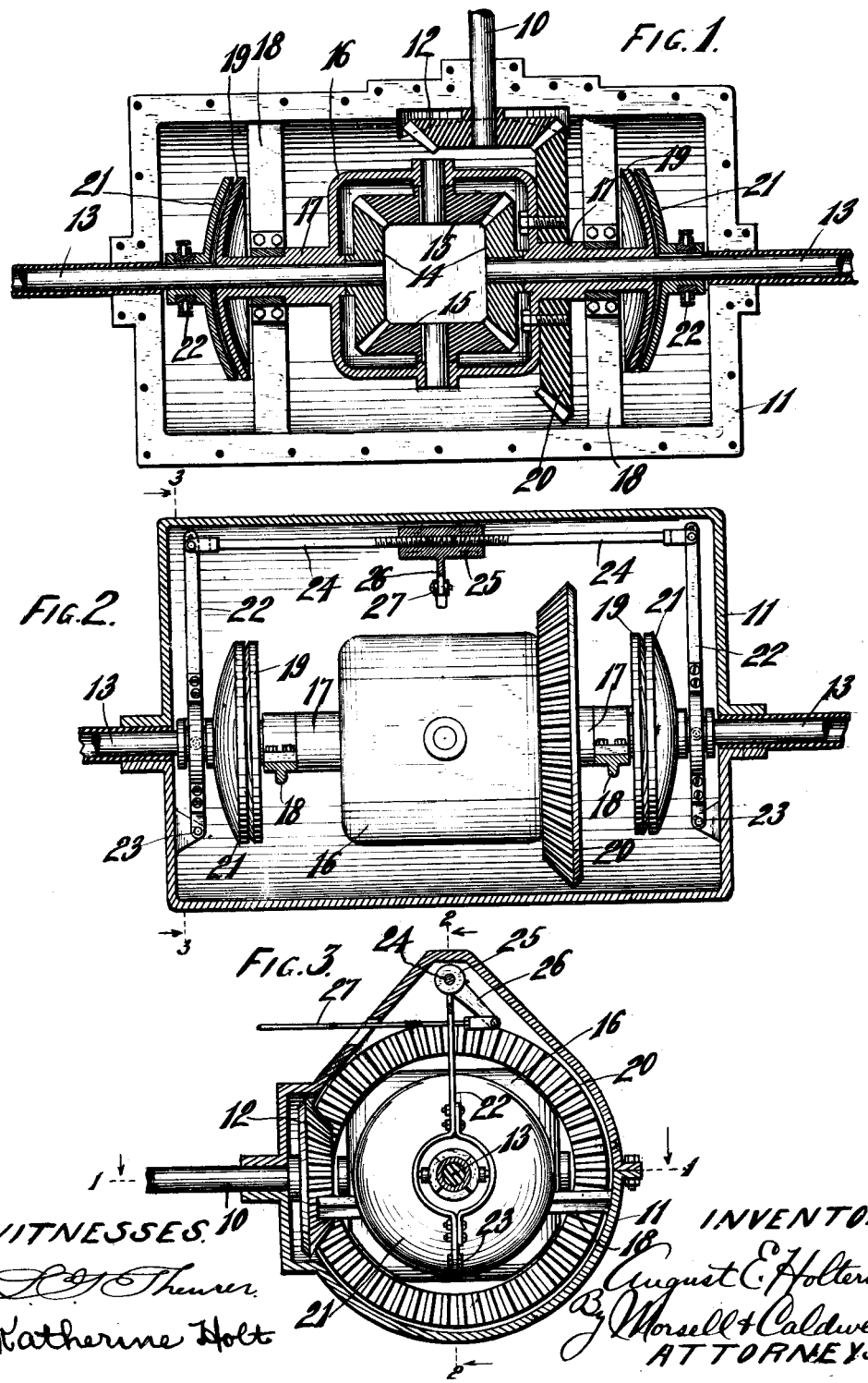

AUGUST E. HOLTERMANN, OF DE PERE, WISCONSIN.

DIFFERENTIAL GEAR.

1,119,284.  Specification of Letters Patent.  Patented Dec. 1, 1914.

Application filed February 10, 1913. Serial No. 747,264.

*To all whom it may concern:*

Be it known that I, AUGUST E. HOLTERMANN, a citizen of the United States, and resident of De Pere, in the county of Brown and State of Wisconsin, have invented new and useful Improvements in Differential Gears, of which the following is a description, reference being had to the accompanying drawings, which are a part of this specification.

This invention has for its object to provide a differential gear for automobiles and the like which will permit of the driving shaft being directly connected with the driving wheels whenever it is desired to dispense with the differential action, as when one driving wheel is on firm ground and the other is on a slippery surface. Without such direct connecting means between the drive shaft and the driving wheels the differential gear will permit the wheel on firm ground to remain still while all of the energy is exerted in turning the comparatively free wheel on the slippery surface without and appreciable tractive effort.

Another object of the invention is to perfect details of construction of a differential gear whereby this result may be accomplished.

With the above and other objects in view the invention consists in the differential gear as herein claimed and all equivalents.

Referring to the accompanying drawings in which like characters of reference indicate the same parts in different views: Figure 1 is a sectional plan view of a differential gear constructed in accordance with this invention; Fig. 2 is a rear view thereof with the casing and other parts sectioned for clearness of illustration; and, Fig. 3 is a transverse sectional view thereof on the plane of line 3—3 of Fig. 2.

In these drawings 10 indicates the drive shaft or engine shaft which enters the differential gear casing 11 with a beveled gear 12 mounted on its end. The differential gear casing 11 is preferably in the form of a sectional casing as shown, the two sections thereof meeting on a horizontal plane through the drive shaft 10 and the two driven shafts 13 which are connected with the driving wheels of the vehicle or other mechanism to be driven. The two driven shafts 13 have beveled pinions 14 on their inner ends meshing with beveled planetary pinions 15 carried by a gear housing 16 which terminates in sleeves 17 loosely surrounding the two driven shafts 13 and journaled in cross pieces 18 of the gear casing 11 with friction disks 19 at their ends. A beveled gear 20 is secured to the gear housing 16 and meshes with the beveled pinion 12 on the drive shaft so that the gear housing 16 is positively driven by the engine to cause the planetary gears 15 to impart a differential driving action through the beveled pinions 14 to the driven shafts 13. Each of the driven shafts 13, however, has a clutch disk 21 splined thereon and movable into engagement with the disk 19 at one end of the sleeve of the differential gear housing. When these disks are engaged there is no longer a differential action between the two driving shafts 13, but both being directly connected with the differential gear housing and therefore with the driving shaft will receive the same driving speed irrespective of their relative resistances.

As a convenient means for engaging the friction disks 21 and 19 which are preferably convex in shape there is provided a yoked lever 22 for each of the disks 21 fulcrumed at 23 to the casing 11 and engaging a groove in the sleeve of said disk 21. A threaded rod 24 is pivotally connected to the upper end of each of the yoked levers 22 and a nut 25 has a right and left hand threaded connection with the ends of the rods 24 so that a turning movement of the nut serves to draw the rods 24 together and thereby engage both friction disks 21 with the friction disks 19. A crank arm 26 projects from the nut 25 and a rod 27 connects therewith and passes through an opening in the casing to a convenient means mounted thereon whereby the driver may effect the turning movement of the nut to engage the friction disks and thus clutch the driving wheels with the driving shaft of the engine when occasion requires.

By the employment of friction disks as a means for directly connecting the driving wheels of the driving shaft with the engine a slight yielding thereof may be permitted when desired to prevent inforced slipping of tires in turning a corner, but in cases where the tractive effort is impaired, as when one driving wheel stands in a mud hole, the engagement of the friction disks may effect a sufficiently positive driving connection between the drive shaft and the driving wheels to cause the engine to exert its effort upon the wheel having a firm bearing and thus restore the tractive effort of the vehicle by depriving the differential gear of its differential action.

What I claim as new and desire to secure by Letters Patent is:

A planetary gearing, comprising a casing having cross pieces therein, a planetary gear housing having shouldered sleeves journaled in the cross pieces, a gear wheel secured to the gear housing, a drive shaft entering the casing, a pinion thereon engaging the gear wheel, planetary gears within the housing, driven shafts journaled through the casing and within the sleeves of the gear housing, pinions on the ends of the driven shafts meshing with the planetary gears, friction disks on the ends of the sleeves of the housing, friction disks splined on the driven shafts and adapted to engage the friction disks of the housing, yoked levers pivotally mounted on the casing and engaging the splined friction disks, threaded rods pivotally connected to the ends of the levers, a nut having a right and left hand threaded engagement with the ends of the rods, an arm on the nut, and a rod connected with the arm and passing through the casing by which the nut may be turned to cause the engagement of the friction disks.

In testimony whereof, I affix my signature, in presence of two witnesses.

AUGUST E. HOLTERMANN.

Witnesses:
WM. G. MADEL,
CARL G. SCOTT.